United States Patent
Nakanishi et al.

(10) Patent No.: US 7,618,711 B2
(45) Date of Patent: *Nov. 17, 2009

(54) RESIN COATED METAL PLATE HAVING EXCELLENT FORMABILITY, WELDABILITY AND CORROSION RESISTANCE, AND WORKED ARTICLES USING THE RESIN COATED METAL PLATE AND METHOD FOR MANUFACTURING SAME

(75) Inventors: Hironobu Nakanishi, Kobe (JP); Kazuhisa Fujisawa, Kobe (JP); Hiroo Shige, Kakogawa (JP); Masatoshi Iwai, Kakogawa (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 639 days.

This patent is subject to a terminal disclaimer.

(21) Appl. No.: 11/059,483

(22) Filed: Feb. 17, 2005

(65) Prior Publication Data

US 2005/0181216 A1 Aug. 18, 2005

(30) Foreign Application Priority Data

Feb. 17, 2004 (JP) .............................. 2004-039714
Jun. 25, 2004 (JP) .............................. 2004-187854

(51) Int. Cl.
*B32B 27/26* (2006.01)
*B32B 27/18* (2006.01)
*B32B 27/20* (2006.01)
*B32B 27/36* (2006.01)
*B32B 27/38* (2006.01)
*B05D 3/02* (2006.01)
*C08L 63/00* (2006.01)
*C08L 67/00* (2006.01)

(52) U.S. Cl. ................. 428/418; 428/413; 428/480; 427/385.5; 427/386; 427/388.1; 523/440; 523/451; 523/457; 523/458; 523/466; 525/438; 525/523; 525/533

(58) Field of Classification Search ................ None
See application file for complete search history.

(56) References Cited

U.S. PATENT DOCUMENTS

| 5,274,021 | A | 12/1993 | Geeck et al. | |
|---|---|---|---|---|
| 6,479,103 | B1 | 11/2002 | Wichelhaus et al. | |
| 7,033,678 | B2 * | 4/2006 | Nakanishi et al. | 428/659 |
| 2002/0151635 | A1 | 10/2002 | Gray et al. | |
| 2003/0064256 | A1 | 4/2003 | Sadvary et al. | |
| 2003/0124379 | A1 * | 7/2003 | Reising et al. | 428/626 |
| 2003/0175541 | A1 | 9/2003 | Lorenz et al. | |
| 2004/0224170 | A1 | 11/2004 | Nakanishi et al. | |

FOREIGN PATENT DOCUMENTS

| EP | 1475 226 A | 4/2004 |
|---|---|---|
| JP | 3057639 | 7/1989 |
| JP | 06-023319 | 7/1992 |
| JP | 2001-277422 | 3/2000 |

OTHER PUBLICATIONS

Machine translation of JP 2001-277422), provided by the JPO website (2001).*
European Search Report dated Jan. 3, 2006.

* cited by examiner

*Primary Examiner*—Michael J Feely
(74) *Attorney, Agent, or Firm*—Stites & Harbison PLLC; Juan Carlos A. Marquez, Esq.

(57) ABSTRACT

A resin coated metal plate having excellent formability comprises, on a metal plate, a resin coating layer containing a conductive filler and a corrosion inhibitor, a matrix resin constituting the resin coating layer is made mainly of a flexible epoxy resin and has a modulus of elasticity of not less than 3 GPa. When secondarily cured, the resin coated metal plate is imparted with excellent weldability and corrosion resistance.

10 Claims, 2 Drawing Sheets

RESIN COATED METAL PLATE HAVING EXCELLENT FORMABILITY, WELDABILITY AND CORROSION RESISTANCE, AND WORKED ARTICLES USING THE RESIN COATED METAL PLATE AND METHOD FOR MANUFACTURING SAME

BACKGROUND OF THE INVENTION

1. Field of the Invention

This invention relates to a resin coated metal plate and a worked article or product using the metal plate and also to a method for manufacturing same. More particularly, the invention relates to a resin coated metal plate wherein a metal plate, preferably a zinc-plated metal plate, is covered on the surface thereof with an epoxy resin-based matrix resin layer or an epoxy resin and polyester resin-based matrix resin layer, each containing conductive fillers, corrosion inhibitors and the like and which thus has excellent formability, weldability and corrosion resistance. The invention also relates to a method for manufacturing such worked articles.

The resin coated metal plate of a type, to which the invention is directed, is useful as a coated steel plate. Such a coated steel plate enables one to simplify a coating step when used, for example, as a coated steel plate such as of automotives, vehicles, vessels and also to permit application of processing grease to bent portions to be omitted, thereby enhancing productivity and providing products of high quality having excellent weldability and corrosion resistance.

2. Description of Related Art

For prior art techniques concerning the manufacture of coated metal plate-worked products, there is known, for example, a method disclosed, for example, in Japanese Laid-open Patent Application (JP-A) No. 6-23319. The present applicant has already developed and provided a technique set out in JP-A No. 2001-277422.

The invention of the JP-A No. 6-23319 discloses a coated metal plate using a paint which contains a polymer having polymerizable double bonds and crosslinkable hydroxyl groups and a blocked polyisocyanate compound. More particularly, when an active energy beam is irradiated to form a primarily cured film having good formability (flexibility), followed by a forming process. After the forming process, the film is baked to cause the blocked polyisocyanate to be reacted thereby providing a completely cured (secondarily cured) film imparted with high hardness and good stain resistance. If UV light is used as the active energy beam, it is recommended to use a photopolymerization initiator.

The invention set forth in the JP-A No. 2001-277422 makes use of a coating composition comprising two or more crosslinking resin components as a surface coating for steel plate. A steel surface is coated with this coating composition, and the resin coating layer is subsequently heated at low temperature, whereupon primary crosslinking reaction is allowed to proceed through a resin component capable of undergoing low-temperature crosslinking reaction while leaving unreacted reactive functional groups. The invention is characterized in that after completion of a metal forming process, heat of baking at the time of over coating is used for carrying out the secondary crosslinking reaction of a resin component that is crosslinkable at high temperature. According to this invention, features reside in that the overcoatability and silk printability are enhanced by means of the primarily crosslinked resin layer being hardened to an extent and the poor heat resistance attributed to the shortage in hardness of the primarily crosslinked resin layer is compensated through the secondary crosslinkage. In the invention, a low temperature-crosslinking epoxy resin is used as a low temperature reactive resin component and a melamine resin used as a high temperature-crosslinking resin composition. In addition, organic lubricants are added so as to improve formability.

SUMMARY OF THE INVENTION

In the technique disclosed in the JP-A No. 6-23319, a paint of a two-step curing type using a combination of UV curing and heat curing is employed. Formability under primary curing conditions may be held, for which UV curing is used. The secondary curing of the coating film in subsequent baking is made to insure hardness and stain resistance without giving consideration to corrosion resistance.

On the other hand, in the JP-A No. 2001-27742, two or more crosslinkable resins having different crosslinking commencing temperatures are used in combination. In this connection, however, at the time when primary curing reaction is carried out, it is essential that unreacted reactive functional groups be left so as to ensure good coating properties and an organic lubricant be formulated for imparting formability (lubricity) to the resulting coating film. More particularly, a high temperature-crosslinkable resin component is added so as to impart a heat resistance to the film in the baking step. The formability is fundamentally dependent on the organic lubricant, and is not improved by suppressing the curing with a low temperature crosslinking agent to a semi-curing level. In addition, the secondary curing of the high temperature crosslinkable resin composition is to improve the heat resistance of the coating film, but is not necessarily carried out for imparting a corrosion resistance to the resin film.

The invention is directed to an improvement of such prior art techniques as set out hereinabove and has for its object the provision of a resin-coated metal plate of high quality wherein a metal plate used is preferably one that is plated with zinc, typical of which is a galvanized steel sheet.

Another object of the invention is to provide such a resin-coated metal plate which has good electric conductivity for ensuring good weldability such as spot weldability and which has good formability such as bendability and is substantially free of peeling off, cracking or powdering of a resin coating in case where a grease for working or the like is not in use.

A further object of the invention is to provide a resin-coated metal plate which exhibits a good corrosion resistance in a corrosion environment after working into a final product of the resin-coated metal plate.

A still further object of the invention is to provide a worked product of the above-mentioned resin coated metal plate, which has a high corrosion resistance and excellent weldability and a convenient method for manufacturing same.

In order to achieve the above objects, the invention contemplates to provide a resin-coated metal plate having excellent conductivity, formability and corrosion resistance, the metal plate comprising a resin coating layer containing a conductive filler and a corrosion inhibitor wherein a matrix resin in the resin coating layer is made mainly of a flexible epoxy resin or a combination of a flexible epoxy resin and a polyester resin and has a modulus of elasticity of not higher than 3 GPa.

The flexible epoxy resin serving as a main matrix component in the resin coating layer according to the invention should most suitably include a urethane-modified epoxy resin and/or a dimer acid-modified epoxy resin. This is because these resins exhibit good formability after primary curing, and strong adhesion to a metal material and an excellent corrosion resistance prior to and after secondary curing. On the other hand, a polyester resin should preferably be a high molecular weight polyester for the reason that such a polyester exhibits good formability after primary curing and good degreasing properties after forming, preferred crosslinking agents to be formulated as a curing agent in these epoxy resins and polyester resins include at least one selected from blocked isocyanates, melamine resins and amine resins.

Preferred contents of the respective components of the matrix resin are within a range of 60 wt % to 90 wt % of a flexible epoxy resin and within a range of 10 wt % to 40 wt % of a polyester resin, respectively.

It will be noted that typical metal plates onto which coating is applied include iron-based metal plates typical of which is steel. Besides, resin coating may be likewise applied to non-ferrous metal plates such as of copper, brass, titanium, zinc and alloys containing these metals. As to the steel plate, not only a bare steel plate is used for the application, but also plated steel plates subjected to plating for the purpose of corrosion resistance, typical of which are molten galvanized steel sheets electric zinc plated steel plates, are used.

The most preferred conductive filler used to impart good weldability to resin coated metal plates includes iron phosphide. As a corrosion inhibitor, at least one selected from the group consisting of aluminium triphosphate, amorphous magnesium silicate and calcium ion exchange silica is preferred.

These conductive filler and corrosion inhibitor are able to enhance formability when a resin-coated metal plate is subjected to bending or the like. In this sense, it is preferred to use them in the form of a fine powder having a maximum particle size of 15 μm or below. The "particle size" used herein means an equivalent spherical diameter determined by a laser diffraction/scattering microtruck. The term "a maximum particle size" is intended to mean that those particles having sizes not larger than 15 μm occupy 99% of the whole particles (i.e. 99% size).

Preferred contents of the respective components for the resin coating layer are within the ranges of from 25 wt % to 55 wt % for a matrix resin, 40 wt % to 55 wt % for a conducive filler, and 5 wt % to 25 wt % for a corrosion inhibitor.

In a more preferred embodiment of the invention, mention is made of a resin coated metal plate wherein two or more types of crosslinking agents with which the epoxy resin, or the epoxy resin and the polyester resin used as a matrix resin are crosslinked, and which have different crosslinking reaction commencing temperatures or different crosslinking reaction rates with substantially same crosslinking reaction commencing temperature are used, and when a crosslinking agent exhibiting a highest crosslinking reaction commencing temperature or a lowest crosslinking reaction rate is taken as crosslinking agent A and a crosslinking agent exhibiting a lowest crosslinking reaction commencing temperature or a highest crosslinking reaction rate is taken as crosslinking agent B, the resin coating layer contains therein a primarily cured reaction product of the epoxy resin, or the epoxy resin and polyester resin, and the crosslinking agent B, and unreacted crosslinking agent A.

In another embodiment of the invention, a method for manufacturing a worked product using the resin coated metal plate and the worked product obtained by the method are also provided. The method comprises subjecting, to a forming process, a resin coated metal plate having, on a metal plate, the resin coating layer which contains a conductive filler, a corrosion inhibitor and a crosslinking agent and has a modulus of elasticity of not greater than 3 GPa, characterized in that simultaneously with or after the forming process, the metal plate is heated to a temperature not lower than a crosslinking reaction commencing temperature and/or for a time not shorter than a crosslinking reaction starting time of the crosslinking agent A, thereby causing the unreacted crosslinking agent A to be reacted for secondary curing. Using this method, there can be obtained a resin coated metal plate worked product or article which has good corrosion resistance and weldability while ensuring excellent formability. The resin coated metal plate worked product obtained by the method is within the scope of the invention.

The resin coated metal plate of the invention includes, on a metal plate, a resin coating layer containing a conductive fill and a corrosion inhibitor. The matrix resin constituting the resin coating layer is made of a member selected from an epoxy resin and a combination of an epoxy resin and a polyester resin, and the bending modulus of elasticity of the resin coating layer is suppressed to a level of not higher than 3 GPa. This enables one to provide a resin-coated metal plate which is free of cracking, powdering or peeling off of the resin coating layer when subjected to bending and thus, has stable, excellent formability, and possesses remarkable corrosion resistance and weldability when worked into a final product. Accordingly, this resin-coated metal plate can be effectively, widely used, for example, as outer panels for vehicles such as automobiles, trains and the like, vessels and home appliances.

Other and further objects, features and advantages of the invention will appear more fully from the following description.

DETAILED DESCRIPTION OF THE PREFERRED EMBODIMENTS

Figure 1:
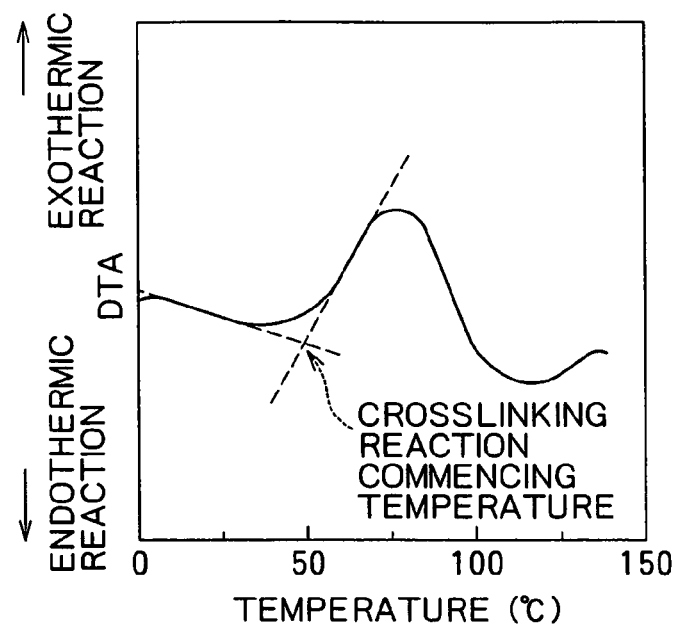
FIG. 1 is an illustrative view showing a model pattern of a DTA chart for illustrating a crosslinking reaction commencing temperature.

As stated hereinbefore, the resin coated metal plate of the invention is formed, on a metal plate, with a resin coating layer containing a conductive filler and a corrosion inhibitor. The resin-coated metal plate is characterized in that the resin coating layer is made mainly of a matrix resin that is selected from a flexible epoxy resin and a combination of a flexible epoxy resin and a polyester resin, and has a modulus of elasticity suppressed to a level of not higher than 3 GPa.

The metal plate on which a resin coating layer is formed is not critical in type and encompasses, aside from iron-based metal plates typical of which is the most versatile steel plate, non-ferrous metal plates such as of copper, aluminium, titanium and the like and alloy plates containing the above-indicated metals. These metal plates may be plated such as by molten zinc plating or electric zinc plating prior to the formation of resin-coating layer, or may be subjected to phosphate or chromate treatment, thereby ensuring more improved corrosion resistance and adhesion properties. Especially, where a steel plate is used, a zinc-plated (molten zinc plated or electric zinc plated) steel plate is favorably used. This is because such a galvanized steel sheet exhibits an excellent corrosion-preventing effect by the sacrificial anodic action if cracks or pinhole defects are caused to occur in the coating layer. The metal plate is not critical with respect to the shape thereof and may be in the form of not only a most popular flat plate, but also profile plates such as of a corrugated, L-shaped or U-shaped form made by pressing along with gutter-shaped or ring-shaped plates.

The resin coating layer formed on the metal plate contains a conductive filler and a corrosion inhibitor in order to ensure weldability and corrosion resistance. Especially, in order to insure stable and excellent formability for use as a so-called post metal plate that enables the resin coating after forming as parts such as of automobiles to be omitted, the matrix resin, of which the coating layer is mainly made, is selected from a flexible epoxy resin or a combination of a flexible epoxy resin and a polyester resin, and the modulus of elasticity of the resin coating layer is suppressed to a level of not higher than 3 GPa.

For resins used to form a resin coating layer on a metal plate which is employed as an outer panel for automobiles, a number of resins are known including polyolefin resin, polyester resins, polyamide resins, aminoplast resins, phenolic resin, alkyd resins and the like. Although attention has been fully paid to corrosion resistance (salt water resistance), weatherability, film adhesion properties and the like, little consideration is given to the flexibility of the coating per se. Hence, special care has not been taken of choice of a resin having good flexibility as a matrix resin.

However, with the resin coated metal plate which is used as a so-called post coated steel plate as in the present invention and wherein a resin coating layer is formed prior to a forming process, the forming process including bending is carried out after the formation of the resin coating, a bending force is essentially applied to the resin coating layer during the forming process. In this condition, if good covering or coating properties are imparted to prior to the forming process, the resin coating layer should not be peeled off or should not undergo cracking or powdering when subjected to bending, but should be one that keeps good formability.

As a result of investigations on the resin coating which is free of such coating defects as mentioned above and guarantees stable and excellent formability if being is carried out after the formation of a resin coating, it has been found that selection of a flexible epoxy resin or a combination of a flexible epoxy resin and a polyester resin as a main component of the matrix resin as set out hereinabove, and setting a modulus of elasticity of the resin-coating layer at 3 GPa or below satisfactorily meet all demands on characteristics.

Figure 6:
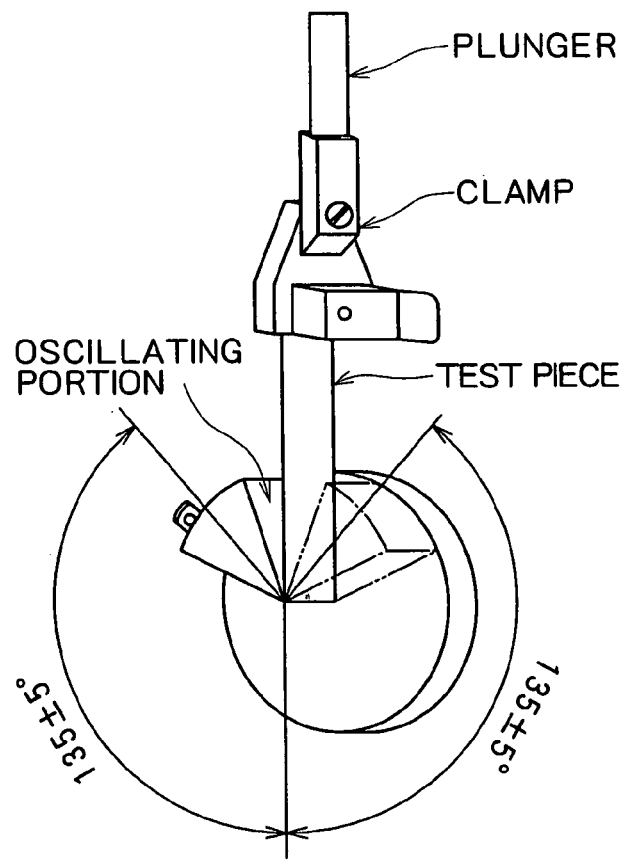
FIG. 6 is an illustrative view showing a repeated bending test used for characteristic assessment of a flexible epoxy resin.

Incidentally, if the modulus of elasticity of a resin coating layer exceeds 3 GPa, a sound coating layer cannot be held as involving peeling off, cracking or powdering of the resin coating layer in the course of various forming processes for making shells of automobiles. In order to ensure the above-mentioned demands on characteristics, a preferred modulus of elasticity is 2.5 GPa or below. It will be noted that a flexible epoxy resin that can satisfies a requirement for such a modulus of elasticity particularly means one which has such a characteristic that when the epoxy resin is subjected to repetition of a bending test (MIT bending test) as shown in FIG. 6 described hereinafter, it can withstand not smaller than 300 repeated bending cycles.

The lower limit of the modulus of elasticity is not critical, but too low a modulus undesirably leads to the trouble that the layer is liable to damage. In this sense, the lower limit is preferably 1.0 GPa or above, more preferably 1.2 GPa or above.

A most preferred flexible epoxy resin that satisfies the required characteristics includes, for example, a urethane-modified epoxy resin wherein urethane bonds are introduced into the molecular structure of an epoxy resin to enhance flexibility, a dimer acid-modified epoxy resin which is modified with a dimer acid.

With the polyester resins, if a molecular weight is too small, formability lowers. On the contrary, too large a molecular weight enables a resulting resin to become sparingly soluble in solvents. Accordingly, those polyester resins having a number average molecular weight of approximately 50,000 to 200,000 are preferably used. This number average molecular weight is a value that is determined, in terms of polystyrene, by using Gel Permeation Chromatograph "150-CALC/GPC (GPC)", made by Waters Inc., wherein hexafluoro-iso-propanol as a solvent.

The mixing ratios of a flexible epoxy resin and a polyester resin are preferably such that flexible epoxy resin=60 to 90 wt % and polyester resin=10 to 40 wt %. If the ratio or content of the polyester resin is less than 10 wt %, the resulting coating is liable to be poor in alkali resistance. On the other hand, when the content exceeds 40 wt %, formability after primary curing tends to lower. The mixing ratio between the flexible epoxy resin and the polyester resin can be confirmed by determining an absorbance of absorption spectrum derived from ester bonds of a polyester by use of the Fourier transform infrared spectrometer (FT-IR) to quantitatively determine (or measure a mixing ratio) of a polyester component in a resin coating.

The curing agent used as a crosslinking agent for the epoxy resin is not critical in type, and preferred ones include block isocyanates, melamine resins and amine curing agents indicated below.

(1) Block isocyanates: those isocyanates whose isocyanate group is blocked with caprolactum, oxime and the like.

(2) Melamine resins: n-butyrated melamine resins, iso-butyrated melamine resins, metylated melamine resins and the like.

(3) Amine curing agents:

Aliphatic polyamines such as diethylenetriamine, dipropylenetriamine, triethylenetetramine tetreethylenepentamine, dimethylamino propylamine, diethylamino propylamine, dibutylaminopropylamine, hexamethylenediamine, N-aminoethylpiperadine, bis-aminopropylpiperadine, trimethylhexamethylenediamine and the like;

Alicyclicpolyamines such as 3,3'-dimethyl-4,4'-diaminodicyclohexylmethane, 3-amino-1-cyclohexylaminopropane, 4,4'-diaminodicyclohexylmethane, isophoronediamine, 1,3-bis(aminomethyl)cyclohexane, N-dimethylcyclohexylamine, heterocyclic diamines and the like;

Aromatic polyamines such as xylylenediamine, 4,4'-diaminodiphenylmethane, 4,4'-diaminophenyl ether, diaminodiphenylsulfone, m-phenylenediamine and the like; and Polyamidoamines such as polyamide resins, polyaminoamides and the like.

Of these crosslinking agents, block isocyanates and melamine resins react with the hydroxyl groups of an epoxy resin, and the amine curing agents react with the epoxy groups. The mixing ratio of an epoxy resin and a crosslinking agent preferably ranges from 0.8 to 1.2, more preferably from 0.9 to 1.1 in terms of "equivalents of reactive functional groups in epoxy resin"/"equivalents of reactive functional groups in a crosslinking agent".

In the practice of the invention, it is important that the coating layer have excellent formability prior to a forming process, and excellent corrosion resistance after the forming process as stated hereinbefore. To this end, it is preferred that such a flexible epoxy resin is used as a main component and two or more of the above-indicated curing agents are used in combination to provide a composition of a type which undergoes curing by two stages. More particularly, at least two types of crosslinking agents whose crosslinking commencing temperatures differ from each other or whose crosslinking commencing temperatures are substantially equal to each other but with different crosslinking reaction rates are used in combination. This enables one to realize primary curing wherein in a state of a resin coating layer prior to forming, a crosslinking agent whose crosslinking commencing temperature is relatively high or whose crosslinking reaction rate is relatively low is left as unreacted, and another type of crosslinking agent alone which has a relatively low crosslinking commencing temperature or a relatively high crosslinking reaction rate is reacted with the epoxy resin. Thus, the resin coating layer is kept as having some degree of flexibility. After a forming process, the crosslinking agent, left as unreacted, which has a higher crosslinking commencing temperature or a lower crosslinking reaction rate is reacted for secondary curing during the course of a heating step ordinarily performed for baking of the coating, thereby providing a final resin coated layer having excellent corrosion resistance.

The term "crosslinking commencing temperature" means a temperature at which an epoxy resin and a crosslinking agent start to react with each other to commence an exothermic reaction when the epoxy resin (or an epoxy resin and a polyester resin) is mixed with the crosslinking agent, the mixture is formed as a film at normal temperatures and the resulting film is applied with heat by use of a differential thermal analyzer (DTA).

The crosslinking reaction rate is determined such that a thermosetting resin curing characteristic measuring device "JSR Curastometer" made by Imanaka Machinery Industrial Co., Ltd., to measure a curing curve of a test resin under conditions of a test temperature of normal temperature to 200° C., a load cell rated load of 20 Kgf and a sample size of 28 mm in outer diameter×8 mm in outer height×2 mm in sample thickness, under which a time required before curing to 10 to 90% at a maximum load is determined as the crosslinking reaction rate.

As crosslinking agent A having a high crosslinking commencing temperature, those having a crosslinking reaction commencing temperature not lower than 135° C. are preferred, although depending on the crosslinking reaction commencing temperature of crosslinking agent B or the temperature in a final coating step, for which melamine resins and blocked isocyanates are preferred. The melamine resin reacts with an epoxy resin mainly through a hydroxyl group or active hydrogen thereof. The blocked isocyanate is one wherein an active isocyanate is blocked with a blocking agent of an active hydrogen-containing compound and which is activated by application of moisture to permit the blocking agent to be volatilized. The crosslinking reaction commencing temperature can be optionally changed by control of the thermal dissociation temperature. Accordingly, the blocked isocyanate may be used as crosslinking agent B having a lower crosslinking reaction commencing temperature.

For crosslinking agent B of lower crosslinking reaction commencing temperature, crosslinking agents showing crosslinking reactivity at approximately 130° C. or below are preferred. Aside from the crosslinking agents A and B, it may be possible to use other type of crosslinking agent whose crosslinking reaction commencing temperature is intermediate therebetween.

As crosslinking agent A, a crosslinking agent having a lower crosslinking reaction rate than crosslinking agent B and capable of undergoing crosslinking reaction under conditions of 160 to 180° C.× about 1 minute is preferred. More particularly, the crosslinking reaction rates of crosslinking agents A and B do not mean an absolutely low or high rate, but a low or high rate relative to each other. Aside from two different types of crosslinking agents having different reaction rates, other type of crosslinking agent having an intermediate crosslinking reaction rate may also be used in combination.

The crosslinking agent A should preferably be present within a range of 1 to 20 wt % based on the total of the resin coating layer. The amount of less than 1 wt % is unfavorable for the reason that the resulting resin coating layer becomes poor in hardness, and the corrosion resistance of the resin coating layer tends to lower. More preferably, the amount is not less than 2 wt %. In this connection, however, if the amount is excessively over 20 wt %, an amount of unreacted crosslinking agent increases to unfavorably lower layer strength. More preferably, the amount is not larger than 10 wt %. On the other hand, when the crosslinking agent is less than 1 wt %, a flaw resistance becomes poor. Over 20 wt %, the crosslinking reaction of a primarily cured product proceeds in excess to provide too hardened a layer, thus being unfavorable for formability. More preferably, the amount is not larger than 10 wt %. The total content of crosslinking agents A, B (or the total of all crosslinking agents if another type of crosslinking agent is further used in combination) exceeds 30 wt %, crosslinking agents are left as they are, so that the resulting secondarily cured layer are unfavorably short of corrosion resistance. Preferably, the total content should be suppressed to 20 wt % or below.

The crosslinking agents A, B in the resin coated metal plate prior to a forming process according to the invention ideally exist in the resin coating layer in such a state that crosslinking agent A is left substantially unreacted with an epoxy resin and crosslinking agent B reacts with the epoxy resin. More particularly, a preferred resin coating layer is one having such a composite composition containing a flexible epoxy resin primarily cured through reaction between an epoxy resin serving as a matrix resin and crosslinking agent B that has the lowest crosslinking reaction commencing temperature or the highest crosslinking reaction rate, and crosslinking agent A, left unreacted, which has the highest crosslinking reaction commencing temperature or the lowest crosslinking reaction rate. Thus, the resin coating layer has an appropriate degree of flexibility. In the state after secondary curing where curing by baking is carried out after the forming process of the resin coated metal plate, there is formed a secondarily cured coating in which crosslinking agent A also takes part in the crosslinking reaction to ensure a high crosslinking density and thus, the coating is strong and excellent in corrosion resistance.

It will be noted that the type and mixing ratio of crosslinking agents for primary curing and secondary curing may be appropriately selected depending on the conditions of the forming process of a post coated metal plate and the baking and curing conditions for the secondary curing. For instance, where the resin coated plate of the invention is applied to, for example, as an outer panel of automobiles, it is assumed that the resin coated steel plate subjected to primary curing is formed as desired in a automobile manufacturer and heating for secondary curing is carried out in a coating baking step of a coating line. The baking for the coating is, in most cases, effected at about 170° C. for about 20 to 30 minutes. Accordingly, a crosslinking agent (crosslinking agent A) for secondary curing is so selected as to be suited for the baking conditions and a crosslinking agent (crosslinking agent B) for primary curing is so selected as to cause crosslinking reaction under lower temperature and shorter time conditions. In this way, the selection of the crosslinking agents for primary and secondary curings is appropriately determined depending, on a case-by-case basis, on the condition on the spot where a resin coated metal plate of the invention is applied to, and should not be determined in a uniform way.

In the practice of the invention, corrosion inhibitors and conductive fillers particularly shown below are essentially formulated, aside from the matrix resin component or components stated hereinabove. More particularly, corrosion inhibitors are used to impart corrosion resistance to a resin coating layer per se, thereby enhancing the corrosion resistance of a metal member. The conductive fillers are used to be responsible for spot welding that is generally used on application as outer panels of automobiles and boats and ships.

Preferred examples of the corrosion inhibitor are listed below.

1) Silica corrosion inhibitors
   Colloidal silica: "SNOWTEX O", "SNOWTEX N", "SNOWTEX 20", "SNOWTEX 30", "SNOWTEX 40", "SNOWTEX C", "SNOWTEX S" (all being commercial names of Nissan Chemical Industries, Ltd.) and the like.
   Fumed silica: "AEROSIL R971", "AEROSIL R812", "AEROSIL R811", "AEROSIL R974", "AEROSIL R202", "AEROSIL R805", "AEROSIL 130", "AEROSIL 200", "AEROSIL 300", "AEROSIL 300CF" (all being commercial names of Nippon Aerosil Co., Ltd.) and the like
   Ion exchanged silica: "SHIELDEX C303", "SHIELDEX AC3", "SHIELDEX C-5" (all being commercial names of Fuji SILYSIA Chemical Co., Ltd.) and the like.
   Aluminium modified silica: "ADELITE AT-20A2" (commercial name of Nippon Aerosil Co., Ltd.) and the like.
2) Phosphate corrosion inhibitors
   Aluminium triphosphate: "K-WHITE 80", "K-WHITE 84", "K-WHITE 105", "K-WHIT G105", "K-WRITE 90" (all being commercial names of Teyca Co., Lt.d)
   Phosphates: zinc phosphate, iron phosphate, aluminium phosphate, aluminium dihydrogenphosphate, zinc phosphate silicate, aluminium zinc phosphate, calcium zinc phosphate and the like.
   Phosphonic acid and phosphonates: zinc phosphite, calcium phosphite, aluminium phosphite, and the like.
3) Molybdate corrosion inhibitors: calcium molybdate, aluminium molybdate, barium molybdate, zinc calcium molybdate, zinc molybdate and the like
4) Phosphorus molybdate corrosion inhibitors: aluminium phosphorus molybdate and the like.
5) Phytic acid and phytate corrosion inhibitors:
6) Silicate corrosion inhibitors: calcium silicate, amorphous magnetic silicate and the like.
7) Vanadium corrosion inhibitors: vanadium oxide and the like.
8) Vanadate/phosphate mixed corrosion inhibitors:
9) Polyaniline corrosion inhibitors: sulfonic acid-doped polyaniline and the like.
10) Cyanamide corrosion inhibitors: zinc cyanamide and the like.

Of these corrosion inhibitors, preferred ones of the invention include aluminium triphosphate, amorphous magnesium silicate compound, and calcium ion exchange silica ("SHIELDEX V303" and the like). Of these three agents, aluminium triphosphate and amorphous magnesium silicate are more preferred because they are able to improve corrosion resistance over calcium ion exchange silica.

In the practice of the invention, the amount (content) of the corrosion inhibitor in the resin coating layer is preferably within a range of 5 to 25 wt % based on solid matters. If the amount is less than 5 wt %, corrosion preventive properties are liable to become poor. On the contrary, if the content exceeds 25 wt %, there is the possibility of an adverse influence on formability. A more preferred content of the corrosion inhibitor ranges from 10 wt % to 20 wt %. It will be noted that the content of corrosion inhibitor is such that if only one agent among the selected three agents is contained, the content means that of one agent, and if two or more agents are present, the total content is meant.

The corrosion inhibitor should favorably be used in the form of finely divided powder whose size is not larger than a thickness of the resin coating layer (ordinarily, about 10 μm). This is for the reason that if the particle size of a corrosion inhibitor exceeds a coating thickness, formability becomes poor. A maximum particle size should preferably be about 15 μm or below.

Of the corrosion inhibitors, aluminium triphosphate develops excellent corrosion preventive properties owing to its pH buffering action and the passive state film forming action. Although aluminium triphosphate may be used as it is, it is preferred to treat with Mg or Ca, thereby providing an Mg or Ca-treated product as developing excellent corrosion preventive properties.

The calcium ion exchange silica develops excellent corrosion preventive properties by the pH buffering action. A preferred concentration of the calcium component in the calcium ion exchange silica ranges from 1 wt % to 10 wt %.

The amorphous magnesium silicate compound is able to develop excellent corrosion preventive properties by the pH buffering action and through the formation of an active state film. The amorphous magnesium silicate compound is prepared by providing an alkali metal silicate and a water-soluble magnesium salt at an atomic ratio of Mg and Si of 0.025:1.0 to 1:1, and reacting in an aqueous solution, filtering the resulting precipitate, followed by washing with water, drying and powdering. The amorphousness can be confirmed through X-ray diffraction.

Next, the conductive filler formulated in order to improve weldability includes, exemplified are metallic powders (Zn, Ni, Cu, Ti, Sn, Ag, Au and the like), and alloy powders (e.g. iron phosphide, ferrosilicon, ferroaluminium, ferromanganese, AlMg, stainless steels and the like. Of these, a preferred one is iron phosphide. This is because when iron phosphide is used as a conductive filler, not only weldability, but also formability is improved. With a zinc rich paint (Zn) generally used for the purpose of improving corrosion resistance and conductivity, powdering is facilitated upon working, with care being given to the use thereof.

It is to be noted that where iron where iron phosphide is used as a conductive filler and the amount (content) thereof exceeds 60 wt %, in terms of a solid matter content, in the total of the a resin coating layer, weldability is improved but formability tends to lower. On the other hand, when the amount is less than 40 wt %, formability is good but satisfactory weldability is difficult to obtain. Thus, the content of the iron phosphide is in the range of 40 wt % to 60 wt %, preferably from 45 wt % to 55 wt %.

As to the particle size, the maximum size of iron phosphide used as a conductive filler is not larger than 15, preferably not larger than 2 µm. When the maximum size exceeds 15 µm, formability becomes poor. It will be noted that a smaller particle size of iron phosphide presents no problem, but with a difficulty in obtaining those particles having a size of 6 µm or below on a commercial base. Accordingly, an indication of a lower limit of the particle size is 6 µm. It will be noted that the particle size means such an equivalent spherical diameter as set forth hereinbefore.

The resin coating layer may contain, aside from the above components, fumed silica as an anti-settling agent. Moreover, the resin coating layer may further contain, within the ranges not impeding the purposes of the invention, a diluent solvent, an anti-skinning agent, a leveling agent, an anti-foaming agent, a penetrator, a emulsifier, a colorant, a thickener a film-forming aid and the like.

If the resin coating layer is too thin, a corrosion resistance becomes poor with the possibility that the particles of iron phosphide may come off, and thus the thickness is preferably 3 µm or over. On the other hand, the thickness is preferably 15 µm or below from the standpoint of weldability.

No specific limitation is placed on the manner of forming a resin coating layer on a metal plate. A composition for the resin coating layer may be applied onto one or both sides of a metal plate according to a known coating method including, for example, a roll coating method, a spraying method, a curtain flow coating method or the like, followed by heat drying. The temperature or time of the heat drying is such that the temperature is not lower than a temperature at which primary crosslinking reaction is allowed to proceed, i.e. a temperature higher than a crosslinking reaction commencing temperature of crosslinking agent B, and is lower than a temperature at which no secondary crosslinking reaction occurs, i.e. a temperature lower than the crosslinking reaction commencing temperature of crosslinking agent B. The drying time is not shorter than a time during which primary crosslinking reaction proceeds, i.e. a time longer than a time before completion of the crosslinking reaction of crosslinking agent B, and is shorter than a time of not permitting secondary crosslinking reaction to be completed, i.e. a time shorter than the crosslinking reaction time of crosslinking agent A. More particularly, the temperature and time of the heat drying depend on the types of crosslinking agents A and B and are generally within a range of about 80 to 120° C. and about a to 10 minutes, respectively.

The heating temperature and time for the secondary curing that is carried out after a forming process may be determined while taking into account the crosslinking reaction commencing temperature and crosslinking reaction rate of crosslinking agent A. In general, the secondary curing is carried out, in most cases, by use of baking heat of the coating, and is usually effected under conditions of 150 to 250° C. and about 20 to 40 minutes. The secondary curing reaction ensures that the resin coating layer, which is short of hardness in a state after forming, is rendered harder through three-dimensional crosslinkage with the unreacted crosslinking agent A left therein, with excellent corrosion resistance and scratch resistance.

EXAMPLES

The invention is more particularly described by way of examples, which should not be construed as limiting the invention thereto. Many variations and alterations may be made within the scope of the invention. It will be noted that testing method used in the following examples are as follows.

[Crosslinking Reaction Commencing Temperature]

A matrix resin (an epoxy resin, or an epoxy resin and a polyester resin) and a crosslinking agent were mixed, coated onto a tetrafluoroethylene sheet in a dry thickness of about 1 mm, and formed as a film at normal temperatures to obtain a dried film. This dried film was provided as a sample and heated by use of a differential thermal analyzer (DTA), followed by determination of a crosslinking reaction commencing temperature from the resulting chart of the analyzer as is particularly shown in FIG. 1.

[Modulus of Elasticity of a Film after Primary Curing]

1) A three-point bending test was performed on an aluminium substrate alone to obtain a gradient of a load-deflection curve.
2) After formation of a resin coating layer on the same substrate, a three-point bending test was carried out to obtain a gradient of the resulting load-deflection curve in the same manner.
3) From a ratio between the gradients obtained 1) and 2) above, a modulus of elasticity of the resin coating was determined.

Figure 2:
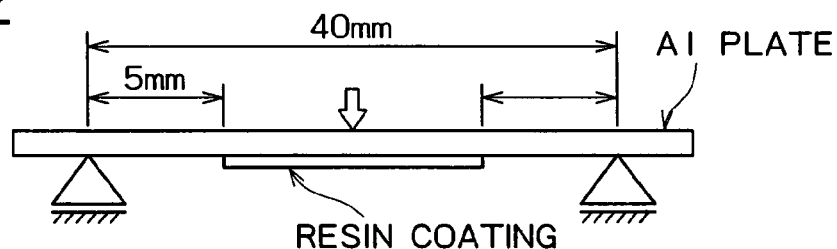
FIG. 2 is a schematic view showing a test piece for measuring a modulus of elasticity.

<Measuring Conditions>
Measuring device: Super precision material tester "Model 5848", made by Instron Inc.
Load cell: 10N capacity
Measuring procedure: Crosshead moving quantity method
Measuring temperature: 23° C. (room temperature)
Distance between supports: 40 mm
Test speed: 0.5 mm/minute
Data processing: Data processing system "Merlin", made by Instron Inc.
Shape of test piece: see FIG. 2

[Formability after Primary Curing]

1) Cylindrical drawing was carried out under the following conditions.
Punching: 90 mm in diameter, punch: 50 mm, dies: 52 mm, BHF (blank holder pressure): 980 N, forming rate: 160 mm/minute
2) Forced tape peeling from surface after forming
3) Measurement of weight loss <Standards for Evaluation>
○: less than 3 $g/m^2$ (excellent)
Δ: from 3 $g/m^2$ to less than 5 $g/m^2$ (good)
x: not less than 5 $g/m^2$ (poor)

[Corrosion Resistance after Secondary Curing]

Figure 3:
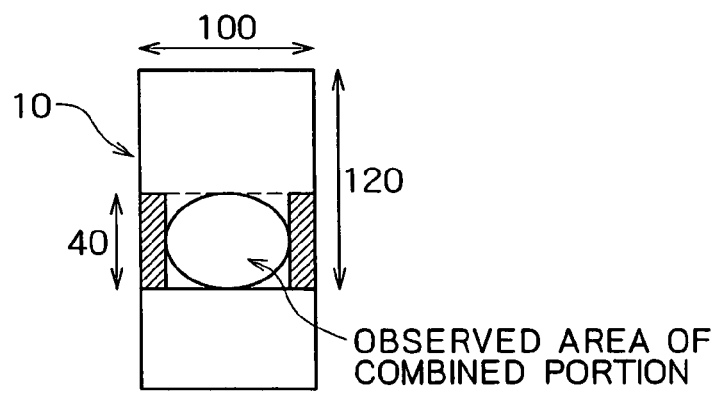
FIG. 3 is an illustrative plan view showing assembling of a combined sample for a corrosion resistance test.
Figure 4:
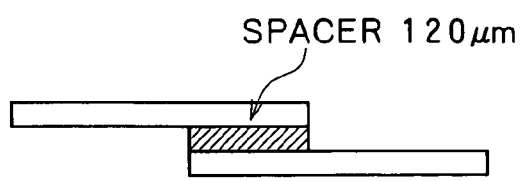
FIG. 4 is an illustrative side view showing assembling of a combined sample for the corrosion resistance test.
Figure 5:
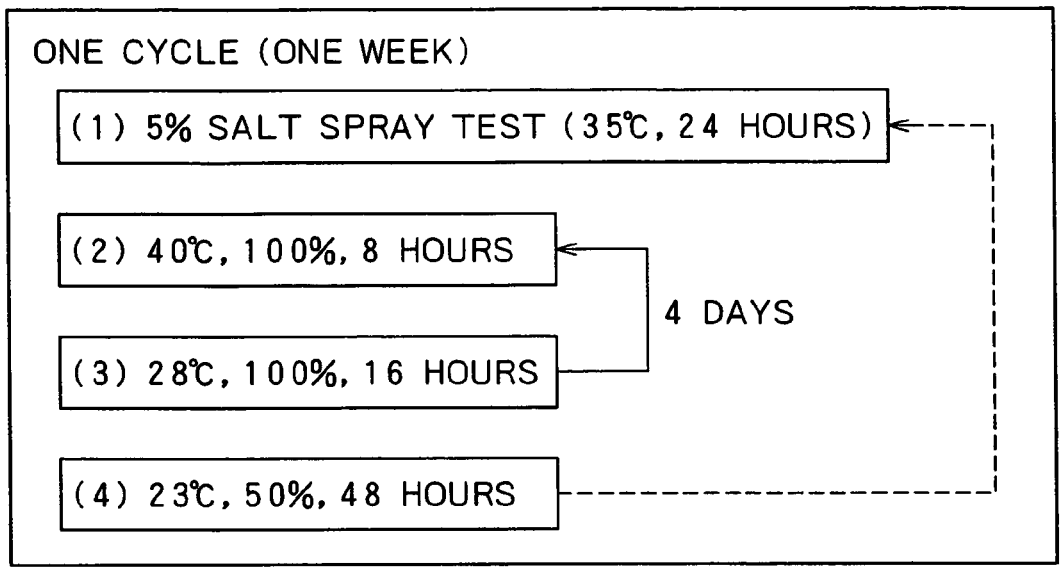
FIG. 5 is an illustrative view showing a cycle test for assessing corrosion resistance.

1) Preparation of combined sample: after preparation of a joined sample as shown in FIGS. 3, 4 a subsequent procedure (as described in an ordinary automobile coating method) was performed.
1-1) Alkaline degreasing (treated with a 3% sodium orthosilicate aqueous solution) under conditions of 40° C.×2 minutes)
1-2) Rinsing with water (30 seconds)
1-3) Phosphate treatment (using the following phosphoric acid aqueous solution under conditions of 60° C.×2 minutes)
   A phosphoric acid aqueous solution (commercial name of "Palbond L3080", made by Nippon Perkarizing Co., Ltd.). The acid concentration in the solution was such that TA=23 Po and FA=0.9 Po provided that Po means an amount of 0.1 N NaOH required for titrating 10 ml of the phosphoric acid aqueous solution therewith when using, as an indicator, TA=phenolphthalein and FA=bromophenol.

1-4) Cathodic electrodeposition coating (intended film thickness: 20 μm)
2) The combined sample subjected to the above treatment was subjected to a corrosion resistivity cycle test.
3) Evaluation standards
   The sample after 20 cycles was opened at the combined portion thereof to check an incidence of red rust and evaluate it according to the following standards.
   ○: less than 0.5%
   Δ: not less than 0.5% to less than 5%
   x: larger than 5%

[Weldability after Secondary Curing]

Continuous spot welding was carried out under the following test conditions to evaluate the weldability in terms of the number of spot welds.

<Test Conditions>
   Tip diameter: 6 mm
   Welding force: 200 kgf
   Welding cycle: 12 cycles
   Welding current: 8.0 kA <Evaluation Standards>
   x: less than 400 points (failure in welding)
   Δ: not less than 400 points to less than 600 points (tolerance level) ○: not less than 600 points to less than 800 points (good)
   ⊚: not less than 800 points (excellent in weldability)

[Alkali Resistance Test after Primary Curing]

After spray-degreasing was carried out under the following test conditions, the sprayed part was subjected for visual examination for evaluation.

<Spray-Degreasing Conditions>
   Spray liquid composition: sodium orthosilicate aqueous solution (2%), made by Nippon Perkarizing Co., Ltd.
   Spraying pressure: 0.7 kg
   Distance between spraying tip and sample plate: 145 mm
   Spray pattern: cone
   Washing with water after degreasing: 30 seconds <Evaluation Standards>
   ○: non-shining
   Δ: shining Experimental Example 1) An epoxy resin (or an epoxy resin and a polyester resin) and curing agents were mixed at mixing ratios indicated in Table 1, to which a conductive filler, (iron phosphide or zinc powder), a corrosion inhibitor (aluminium triphosphate or magnesium/silica) and an anti-settling agent (commercial name of "R972", made by Nippon Aerosil Co., Ltd.) were added at ratios indicated in Table 2. It will be noted that the respective starting materials were dissolved or dispersed in a mixed solvent of xylene/propylene glycol monomethyl ether acetate/n-butanol at ratios by weight of 4:3:1 to prepare compositions each having a solid concentration of 50 wt %.
2) While cooling, the mixtures obtained above were each agitated by use of a homogenizer at 3000 r.p.m. for 10 minutes.
3) The resulting uniform dispersion was used and coated, by means of a bar coater, onto an alloyed, molten zinc plated steel plate subjected to a non-chromate undercoating treatment in a dry thickness of 0 μm.
4) The thus coated steel plate was fed into a continuous heating furnace and heated to 140° C. in terms of PMT (probable maximum temperature), thereby performing the removal of the solvent and primary curing.
5) The resulting primarily cured resin coated steel plate was used to conduct an evaluation test on formability.
6) Further, the primarily cured resin coated steel plate obtained 4) above was heated at 230° C. in terms of PMT for secondary curing.
7) The secondarily cured resin coated metal plate was subjected to evaluation tests on corrosion resistance and weldability.

The results are all shown in Table 3.

TABLE 1

|  | Urethane-modified epoxy resin | Polyester resin | Crosslinking agent | | | Modulus of elasticity after primary curing (GPa) |
|---|---|---|---|---|---|---|
|  |  |  | Blocked isocyanate 1 | Blocked Isocyanate 2 | Butyrateed melamine resin |  |
| Nos. 1-3 | 85 | — | 5 | — | 10 | 2.2 |
| No. 4 | 85 | — | 5 | 10 | — | 1.5 |
| No. 5 | 85 | — | — | 5 | 10 | 2 |
| No. 6 | 70 | 15 | 5 | — | 10 | 2.4 |
| No. 7 | 80 | 5 | 5 | — | 10 | 2.3 |
| No. 8 | 85 | — | 2 | — | 13 | 3.1 |
| No. 9 | 85 | — | — | — | 15 | 3.3 |
| Nos. 10, 11 | 85 | — | 5 | — | 10 | 2.2 |
| No. 12 | 40 | 45 | 5 | — | 10 | 3.4 |
| Reference 1 | 85 | — | 15 | — | — | 1.7 |

TABLE 2

|  | Epoxy resin (+polyester resin) (containing curing agent) | Aluminium Tripolyphosphate | Magnesium/silica | Conductive Filler | | Anti-settling Agent |
|---|---|---|---|---|---|---|
|  |  |  |  | FeP | Zn |  |
| No. 1 | 38 | 10 | — | 50 | — | 2 |
| No. 2 | 38 | — | 10 | 50 | — | 2 |
| No. 3 | 38 | 10 | — | — | 50 | 2 |
| No. 4 | 38 | 10 | — | 50 | — | 2 |
| No. 5 | 38 | 10 | — | 50 | — | 2 |
| No. 6 | 38 | 10 | — | 50 | — | — |
| No. 7 | 38 | 10 | — | 50 | — | 2 |
| No. 8 | 38 | 10 | — | 56 | — | 2 |
| No. 9 | 38 | 10 | — | 50 | — | 2 |
| No. 10 | 42 | — | — | 50 | — | 2 |

TABLE 2-continued

|  | Epoxy resin (+polyester resin) (containing curing agent) | Aluminium Tripolyphosphate | Magnesium/ silica | Conductive Filler FeP | Conductive Filler Zn | Anti-settling Agent |
|---|---|---|---|---|---|---|
| No. 11 | 38 | 10 | — | 50 | — | 2 |
| No. 12 | 38 | 10 | — | 50 | — | 2 |
| Reference 1 | 38 | 10 | — | 50 | — | 2 |

In No. 9 and reference 1, each sample was treated at a crosslinking temperature of the crosslinking agent used. In No. 9, the corrosion resistance was evaluated without secondary crosslinking.

TABLE 3

|  | Formability after primary curing | Corrosion resistance after secondary curing | Weldability after secondary curing | Alkali resistance test after primary curing |
|---|---|---|---|---|
| No. 1 | ○ | ○ | ◎ | Δ |
| No. 2 | ○ | ○ | ◎ | Δ |
| No. 3 | Δ | ○ | ○ | — |
| No. 4 | ○ | ○ | ◎ | — |
| No. 5 | ○ | ○ | ◎ | — |
| No. 6 | ○ | ○ | ◎ | ○ |
| No. 7 | ○ | ○ | ◎ | Δ |
| No. 8 | X | ○ | ◎ | ○ |
| No. 9 | X | ○ | ◎ | ○ |
| No. 10 | ○ | X | ◎ | — |
| No. 11 | ○ | X | ◎ | — |
| No. 12 | X | ○ | ◎ | ○ |
| Reference 1 | ○ | Δ | ◎ | — |

What is claimed is:

1. A resin coated metal plate comprising:
   a metal plate, and
   a resin coating layer formed on said metal plate, said resin coating layer comprising a resin coating composition that has undergone both primary and secondary curing;
   wherein the resin coating composition comprises 40-60 wt % of a conductive filler, 5-25 wt % of a corrosion inhibitor, a matrix resin, a primary crosslinking agent, and a secondary crosslinking agent;
   wherein the matrix resin consists of a flexible epoxy resin and a polyester resin provided in a mixing ratio of 60 to 90 wt %:40 to 10 wt %;
   wherein the primary and secondary crosslinking agents either have different crosslinking reaction commencement temperatures or have different crosslinking reaction rates with a substantially same crosslinking reaction commencement temperature; said secondary crosslinking agent exhibiting a relatively high crosslinking reaction commencement temperature or a relatively low crosslinking reaction rate; said primary crosslinking agent exhibiting a relatively low crosslinking reaction commencement temperature or a relatively high crosslinking reaction rate;
   wherein the resin coated metal plate is produced by:
   (a) applying the resin coating composition to the metal plate;
   (b) performing primary curing of the resin coating composition, allowing the primary crosslinking agent to react with the matrix resin; wherein the primarily cured resin coating composition has a modulus of elasticity of not more than 3 GPa; and
   (c) performing secondary curing of the resin coating composition, allowing the secondary crosslinking agent to react with the primarily cured resin coating composition.

2. The resin coated metal plate according to claim 1, wherein said flexible epoxy resin is made of a urethane-modified epoxy resin, a dimer acid-modified epoxy resin or a mixture thereof.

3. The resin coated metal plate according to claim 1, wherein said crosslinking agents are for the flexible epoxy resin and is at least one member selected from the group consisting of a blocked isocyanate, a melamine resin and an amine resin.

4. The resin coated metal plate according to claim 1, wherein said conductive filler is made of iron phosphide.

5. The resin coated metal plate according to claim 1, wherein said corrosion inhibitor is at least one member selected from the group consisting of aluminium triphosphate, amorphous magnesium silicate compound, and calcium ion exchange silica.

6. The resin coated metal plate according to claim 1, wherein said conductive filler and said corrosion inhibitor are each in the form of a powder having a maximum size of not larger than 15 μm.

7. The resin coated metal plate according to claim 1, wherein said metal plate is subjected to plating.

8. The resin coated metal plate according to claim 1, wherein said modulus of elasticity is within a range of 1.2-2.5 GPa.

9. A resin coated metal plate comprising:
   a metal plate, and
   a resin coating layer formed on said metal plate, said resin coating layer comprising a resin coating composition that has undergone primary curing;
   wherein the resin coating composition comprises 40-60 wt % of a conductive filler, 5-25 wt % of a corrosion inhibitor, a matrix resin, a primary crosslinking agent, and a secondary crosslinking agent;
   wherein the matrix resin consists of a flexible epoxy resin and a polyester resin provided in a mixing ratio of 60 to 90 wt %:40 to 10 wt %;
   wherein the primary and secondary crosslinking agents either have different crosslinking reaction commencement temperatures or have different crosslinking reaction rates with a substantially same crosslinking reaction commencement temperature; said secondary crosslinking agent exhibiting a relatively high crosslinking reaction commencement temperature or a relatively low crosslinking reaction rate; said primary crosslinking agent exhibiting a relatively low crosslinking reaction commencement temperature or a relatively high crosslinking reaction rate;

wherein the resin coated metal plate is produced by:

(a) applying the resin coating composition to the metal plate; and (b) performing primary curing of the resin coating composition, allowing the primary crosslinking agent to react with the matrix resin; wherein the primarily cured resin coating composition has a modulus of elasticity of not more than 3 GPa.

10. A method of fabricating a resin coated metal plate having good weld-ability and corrosion resistance comprising:

(a) preparing a resin coating composition, wherein the resin coating composition comprises 40-60 wt % of a conductive filler, 5-25 wt % of a corrosion inhibitor, a matrix resin, a primary crosslinking agent, and a secondary crosslinking agent;

wherein the matrix resin consists of a flexible epoxy resin and a polyester resin provided in a mixing ratio of 60 to 90 wt %:40 to 10 wt %;

wherein the primary and secondary crosslinking agents either have different crosslinking reaction commencement temperatures or have different crosslinking reaction rates with a substantially same crosslinking reaction commencement temperature; said secondary crosslinking agent exhibiting a relatively high crosslinking reaction commencement temperature or a relatively low crosslinking reaction rate; said primary crosslinking agent exhibiting a relatively low crosslinking reaction commencement temperature or a relatively high crosslinking reaction rate;

(b) applying the resin coating composition to the metal plate;

(c) performing primary curing of the resin coating composition, allowing the primary crosslinking agent to react with the matrix resin; wherein the primarily cured resin coating composition has a modulus of elasticity of not more than 3 GPa; and (d) performing secondary curing of the resin coating composition, allowing the secondary crosslinking agent to react with the primarily cured resin coating composition.

* * * * *

UNITED STATES PATENT AND TRADEMARK OFFICE
CERTIFICATE OF CORRECTION

PATENT NO.       : 7,618,711 B2                                         Page 1 of 1
APPLICATION NO. : 11/059483
DATED            : November 17, 2009
INVENTOR(S)      : Nakanishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1117 days.

Signed and Sealed this

Twenty-sixth Day of October, 2010

David J. Kappos
*Director of the United States Patent and Trademark Office*